Patented Aug. 19, 1941

2,253,082

UNITED STATES PATENT OFFICE 2,253,082

NITROALKYLAMINO-ANTHRAQUINONE DYE COMPOUNDS

James G. McNally and Joseph B. Dickey, Rochester, N. Y., assignors to Eastman Kodak Company, Rochester, N. Y., a corporation of New Jersey No Drawing. Application June 10, 1939, Serial No. 278,584

6 Claims. (Cl. 260—371)

The present invention relates to anthraquinone dyestuffs and to fibers colored therewith. More particularly it relates to anthraquinone compounds containing in an α-position at least once in their molecule a nitroalkylamino group which is joined directly to the anthraquinone nucleus through the nitrogen atom of the amino portion of said nitroalkylamino group and in which the nitro group is separated from the said nitrogen atom by at least two carbon atoms.

It is an object, therefore, of our invention to prepare the dyes of the class above described and to color cellulose organic derivatives, particularly cellulose acetate in the form of threads, yarns, filaments and fabric materials therewith.

Typical organic derivatives of cellulose include the hydrolyzed as well as the unhydrolyzed cellulose organic acid esters and cellulose mixed organic acid esters such as cellulose acetate, cellulose formate, cellulose propionate, cellulose butyrate, cellulose acetate-propionate, cellulose acetate-butyrate and the cellulose ethers such as methyl cellulose, ethyl cellulose, and benzyl cellulose.

The dye compounds of our invention may be obtained by condensing various α-amino anthraquinones, α-hydroxyanthraquinones, and α-alkoxyanthraquinones and their corresponding leuco derivatives with a nitroalkylamine having the general formula:

$$H_2N-R-NO_2$$

wherein R represents an alkylene group of at least two carbon atoms.

In order that our invention may be clearly understood, it will be noted that the expression "a nitroalkylamino group" includes not only the nitroalkylamino groups in which the "alkyl" group is unsubstituted except by nitro group such as —NHCH₂CH₂NO₂,

—NHCH₂CHCH₃    —NHCH₂CH₂CH₂NO₂
     |
    NO₂

—NHCH₂CHCH₂CH₃    —NHCH₂C(CH₃)CH₃
     |                  |
    NO₂                NO₂

—NHCH₂CH₂CH₂CH₂NO₂    —NHCH₂C(CH₃)CH₂CH₃
                            |
                           NO₂

—NHCHCH₂NO₂ and    —NHCH₂CH₂CH₂CH₂CH₂NO₂
     |

but also nitroalkylamino groups in which the alkyl group is substituted in addition to the nitro group with other groups such as —NHCHCH₂OH        —NHCH₂CH₂CHCH₂NO₂
     |                        |
    NO₂                      OH —NHCH₂CHCH₂NO₂    —NHCH₂CHCH₂CH₂OH
     |                   |
    OH                  NO₂

—NHCHCH₂NO₂       —NHCHCH₂NO₂
     |                 |
    C₆H₅             cyclohexyl —NHCHCH₂NO₂
     |
    furyl and other compounds of analogous nature. The above type of nitroalkylamine compounds may be prepared by the following general method. 1 mol of nitroethylene or substituted nitroethylene are added at 0° C. to an alcoholic solution containing 15–20 molecular equivalents of ammonia. The reaction mixture is warmed to room temperature and allowed to stand for 24 hours, after which the ammonia and alcohol are flashed off and the nitroalkylamine recovered in purified form by distillation. There is obtained a good yield of β-nitroethylamine or substituted β-nitroethylamine and small amounts of the corresponding secondary and tertiary amines. In place of nitroethylene there may be substituted nitropropylenes, nitrobutylenes and nitroamylenes.

The following examples illustrate the preparation of the α-nitroalkylamino substituted anthraquinone compounds of our invention.

Example 1

24.0 grams of leucoquinizarin are heated in 200 ccs. of butanol with 9.0 grams of β-nitroethylamine for 4 hours. The mixture is poured into water and the leuco dye product oxidized by the addition of sodium perborate. Cellulose acetate is colored purple shades from aqueous suspensions of the dye.

The anthraquinone dye thus obtained has the formula:

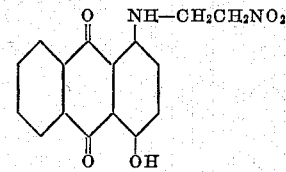

In place of leucoquinizarin there may be substituted 1, 4, 5, 8-tetrahydroxyanthraquinone, and in place of β-nitroethylamine there may be substituted α-methyl-β-nitroethylamine, in which case the resulting dyestuff has the formula:

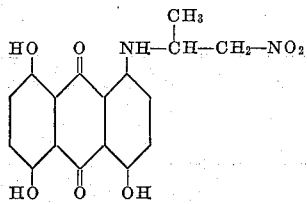

Example 2

24.0 grams of quinizarin and 10.4 grams of 1-amino-2-nitropropane are heated together in 200 ccs. of pyridine for 10 hours or until no further color change takes place. The dye crystallizes out of solution upon cooling. Cellulose acetate is colored purple shades from aqueous suspensions of the dye.

The anthraquinone compound prepared as above has the formula:

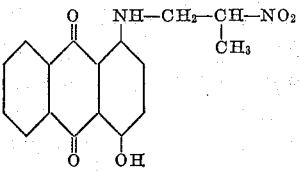

Example 3

25.0 grams of 1-methoxy-4-aminoanthraquinone are dissolved in boiling methanol and 9.0 grams of β-nitroethylamine are added dropwise with stirring. When the reaction is complete, the dye is crystallized from the solution by cooling. Cellulose acetate is colored reddish-blue shades from aqueous suspensions of the dye.

The anthraquinone compound thus obtained has the formula:

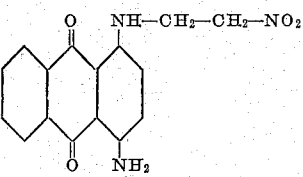

In place of 1-methoxy-4-aminoanthraquinone there may be substituted 1,5-dimethoxy-4,8-diaminoanthraquinone, the dye resulting therefrom having the formula:

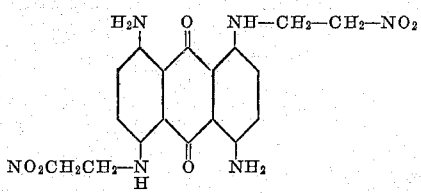

and coloring cellulose acetate blue-green shades from aqueous suspensions of the dye. Similarly there may be prepared from 1-methoxy-4,5-diamino-8-hydroxyanthraquinone with 1-Me-2-nitro-1-aminopropanol-3 the dye compound having the formula:

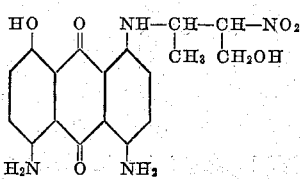

which colors cellulose acetate greenish-blue shades from aqueous suspensions of the dye.

Example 4

24.0 grams leucoquinizarin are heated in 200 ccs. of pyridine with 20.0 grams of β-nitroethylamine for 6 hours, and the resulting leuco dye is oxidized by passing air into the solution. When the reaction is complete, the dye is crystallized from the solution on cooling. Cellulose acetate is colored blue from aqueous suspensions of the dye.

The anthraquinone compound thus obtained has the formula:

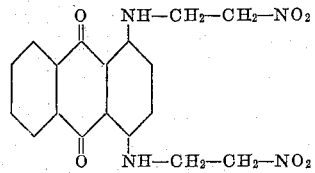

In place of β-nitroethylamine there may be used a mixture of two different nitroalkylamines in equivalent quantities, for example, β-nitroethylamine and 1-amino-2-nitro-butanol-4 produces a compound having the formula:

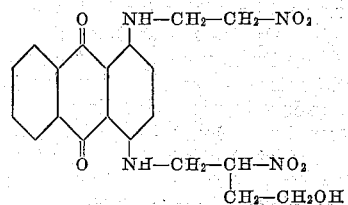

which colors cellulose acetate blue shades from its aqueous suspensions. With β-nitroethylamine and α-amino-β-nitro ethylbenzene the compound produced has the formula:

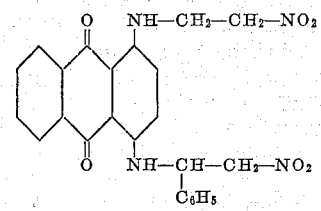

which colors cellulose acetate blue shades from its aqueous suspensions. Similarly there may be obtained with β-nitroethylamine and α,α′-amino-cyclohexyl-β-nitroethane the compound having the formula:

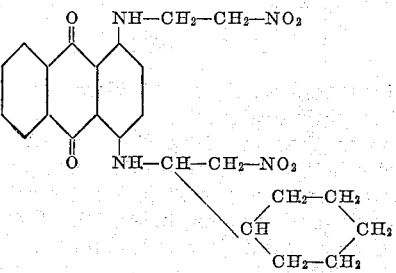

which colors cellulose acetate blue shades from its aqueous suspensions; and with β-nitroethylamine and α,α-amino-furyl-β-nitroethane the compound:

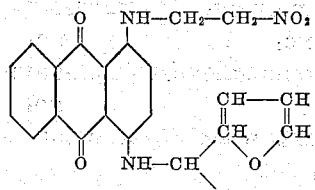

which colors cellulose acetate blue shades from its aqueous suspensions. In place of quinizarin there may be used 1,4,5,8-tetrahydroxyanthraquinone which produces with a mixture of one equivalent of β-nitroethylamine and one equivalent of 1-nitro-2-amino-butane the compound:

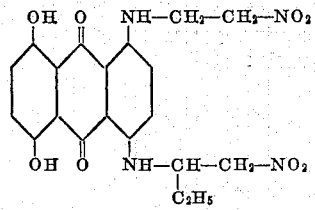

which colors cellulose acetate blue shades from its aqueous solutions.

*Example 5*

9.0 grams of β-nitroethylamine, 4.0 grams of methylamine, and 24.0 grams of leuco-1,4-diaminoanthraquinone are heated together under reflux in 150 ccs. of butanol. The mixture is then poured into water and the leuco dye product oxidized with sodium perborate. The dye compound crystallizes out of solution on cooling. Cellulose acetate is colored blue shades from aqueous suspensions of the dye.

The anthraquinone compound thus obtained has the formula:

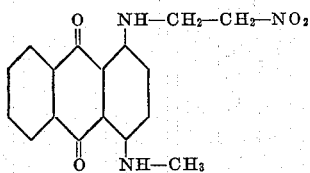

In place of leuco-1,4-diamino anthraquinone there may be substituted leuco-1,4-diamino-5,8-dihydroxyanthraquinone, leuco-1,4-diamino-5-hydroxyanthraquinone, and 1,4,5,8-tetramino anthraquinone, and in place of the mixture of β-nitroethylamine and methylamine there may be substituted equivalent quantities of 1-amino-2-nitro-3-sodium sulfopropane and butyl amine, 1-amino-2-nitro-3-sodium sulfopropane and hexylamine, 1-amino-2-nitro-3-sodium sulfopropane and cetylamine, β-nitroethylamine and β-methoxyethylamine, β-nitroethylamine and isopropylamine, and 1-α-amino-β-nitroethyl benzene-4-sulphonic acid, the compounds resulting therefrom including 1-β-nitro-γ-sodium sulfopropylamino-4-butylamino anthraquinone, 1-β-nitro-γ-sodium sulfopropyl amino-4-hexylamino anthraquinone, 1-β-nitro-γ-sodium sulfopropylamino-4-cetylamino anthraquinone, 1-β-nitroethylamino-4-methoxyethylamino - 5,8 - diamino anthraquinone, 1-β-nitroethylamino-4-isopropylamino - 5 - hydroxyanthraquinone, and 1 - α - phenyl - 4' - sulphonic acid-β-nitroethylamino-4-propylamino-5,8-dihydroxy anthraquinone.

*Example 6*

18.0 grams of quinizarin, 6.0 grams of leucoquinizarin, 6.5 grams of ethanolamine, and 9.0 grams of β-nitroethylamine are heated under reflux in butanol for 6 hours after which the reaction mixture is oxidized with sodium perborate, and the dye obtained as crystals on cooling the solution. Cellulose acetate is colored blue shades from aqueous suspensions of the dye.

The anthraquinone compound prepared as above has the formula:

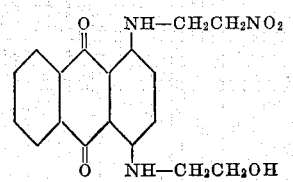

In place of quinizarin and leucoquinizarin there may be used equivalent quantities respectively of 1,4,5,8-tetrahydroxyanthraquinone and leuco - 1,4,5,8-tetrahydroxyanthraquinone and 1,4,8 - trihydroxy - 5 - aminoanthraquinone and leuco - 1,4,8 - trihydroxy - 5 - aminoanthraquinone, and in place of β-nitroethylamine and ethanolamine there may be used equivalent quantities respectively of β-nitroethylamine and 1-amino-propanol-3 or 1-amino-propanol-2,β-nitroethylamine and tetrahydrofurfurylamine, β-nitroethylamine and cyclohexylamine, β-nitroethylamine and β-sodium sulfoethylamine, and α-methyl-β-nitroethylamine and β-hydroxyethoxyethylamine, the compounds resulting therefrom including among others 1-β-nitroethylamino-4-β-hydroxy-propylamino anthraquinone, 1 - β - nitroethylamino-4-γ-hydroxypropylamino anthraquinone, 1-β-nitroethylamino-4-β-hydroxyethylamino - 5,8 - dihydroxyanthraquinone, 1-β-nitroethylamino-4-tetrahydrofurfurylamino anthraquinone, 1-β-nitroethylamino-4-cyclohexylamino-5-amino-8-hydroxy anthraquinone, 1 - β - nitroethylamino - 4 - β - sodium sulfoethylamino anthraquinone, and 1-α-methyl-β-nitroethylamino-4-β-hydroxyethoxy ethylamino anthraquinone.

*Example 7*

24.0 grams of leucoquinizarin, 10.0 grams of β-nitroethylamine, and 15.0 grams of p-phenylene diamine are heated together under reflux in pyridine until no further color change takes place. The leuco dye product is oxidized by passing air into the solution. Cellulose acetate is colored blue-green shades from aqueous suspensions of the dye.

The anthraquinone compound thus obtained has the formula:

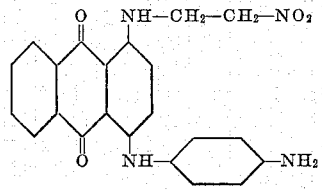

*Example 8*

27.0 grams of leuco tetroxyanthraquinone are heated on a steam bath with 150 grams of β-nitroethylamine until no further color change takes place. The reaction product is oxidized and appears to be a mixture of 1,4,5,8-tetra-β-nitroethylamino anthraquinone and 1,4,5-tri-β-nitroethylamino-8-hydroxyanthraquinone.

The β-nitroalkylamino anthraquinones of our invention may also be prepared by an alternative procedure wherein an unsaturated nitroethylene is added to an aminoanthraquinone compound. This process is illustrated in part by the following example.

*Example 9*

24.0 grams of 1,4-diaminoanthraquinone are heated at 50–200° C. in dioxane with 20 grams of nitroethylene until no further color change takes place. The reaction mixture is poured into water and the dye obtained as crystals upon cooling the solution. Cellulose acetate is colored blue from aqueous suspensions of the dye.

The anthraquinone compound obtained by the above addition reaction has the formula:

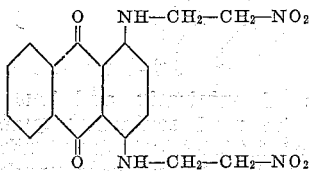

In employing the anthraquinone compounds of our invention as dyes, they will ordinarily be applied to the material in the form of an aqueous suspension which can be prepared by grinding the dye to a paste with a sulfonated oil, soap or other suitable dispersing agent and dispersing the resulting paste in water. The material to be colored such as a fibrous organic derivative of cellulose, but more particularly a thread or fabric of cellulose acetate is immersed in the dispersion thus prepared and heated to a temperature approximating 45–55° C., after which the dye bath temperature is raised gradually to 80–85° C., and maintained at this point for several hours. Sodium chloride may be added if desired during the dyeing operation to promote exhaustion of the dye bath. Upon completion of the dyeing operation, the cellulose acetate material is removed from the dye bath, washed with soap, rinsed and dried.

We claim:

1. Anthraquinone dye compounds containing in an α-position at least once in their molecule a nitroalkylamino group which is joined directly to the anthraquinone nucleus through the nitrogen atom of the amino portion of said nitroalkylamino group and in which the nitro group is separated from the said nitrogen atom by at least two carbon atoms.

2. Anthraquinone dye compounds containing in an α-position at least once in their molecule an unsubstituted nitroalkylamino group which is joined directly to the anthraquinone nucleus through the nitrogen atom of the amino portion of said nitroalkylamino group and in which the nitro group is separated from the said nitrogen atom by at least two carbon atoms.

3. Anthraquinone dye compounds containing in an α-position at least once in their molecule a β-nitroalkylamino group which is joined directly to the anthraquinone nucleus through the nitrogen atom of the amino portion of said β-nitroalkylamino group.

4. Anthraquinone dye compounds containing in an α-position at least once in their molecule a nitroalkylamino group which is joined directly to the anthraquinone nucleus through the nitrogen atom of the amino portion of said nitroalkylamino group and in which the nitro group is separated from the said nitrogen atom by at least two carbon atoms and is attached to the omega carbon atom of the alkyl group.

5. Anthraquinone dye compounds having the general formula:

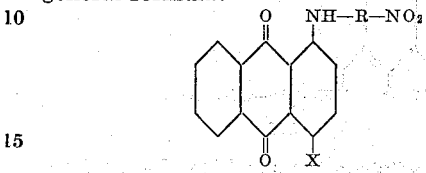

wherein R represents an alkylene group of at least two carbon atoms, and X represents a member selected from the group consisting of a hydroxyl group, an amino group, an alkylamino group, a hydroxyalkylamino group, an alkoxyalkylamino group, a hydroxyalkoxyalkylamino group, a cycloalkylamino group, a sulfoalkylamino group, a sulfatoalkylamino group, an arylamino group, and the group —NH—R—NO$_2$.

6. The anthraquinone dye compounds having the general formula:

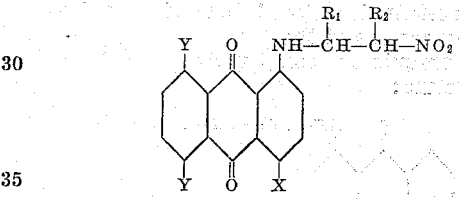

wherein R$_1$ and R$_2$ each represent a member selected from the group consisting of hydrogen, an alkyl group, a hydroxyalkyl group, a cycloalkyl group, a sulfoalkyl group, a sulfatoalkyl group, and a phenyl group, X represents a member selected from the group consisting of a hydroxyl group, an amino group, an alkylamino group, a hydroxyalkylamino group, an alkoxyalkylamino group, a hydroxyalkoxyalkylamino group, a cycloalkylamino group, a sulfoalkylamino group, a sulfatoalkylamino group, an arylamino group, and the group

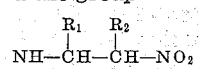

and each Y represents a member selected from the group consisting of hydrogen, a hydroxyl group, an amino group, an alkylamino group, and the group

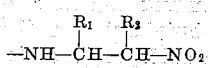

JAMES G. McNALLY
JOSEPH B. DICKEY.